(12) United States Patent
Alger et al.

(10) Patent No.: US 9,733,918 B2
(45) Date of Patent: Aug. 15, 2017

(54) USING CLOUD PATTERNS FOR INSTALLATION ON UNMANAGED PHYSICAL MACHINES AND APPLIANCES

(71) Applicant: International Business Machines Corporation, Armonk, NY (US)

(72) Inventors: Joshua A. Alger, Raleigh, NC (US); Jeffrey R. Hoy, Southern Pines, NC (US); Barry J. Pellas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/633,402

(22) Filed: Feb. 27, 2015

(65) Prior Publication Data
US 2016/0253160 A1  Sep. 1, 2016

(51) Int. Cl.
*G06F 9/445* (2006.01)
*H04L 29/08* (2006.01)

(52) U.S. Cl.
CPC .............. *G06F 8/61* (2013.01); *H04L 67/34* (2013.01)

(58) Field of Classification Search
CPC .............. G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 7,356,679 B1 | 4/2008 | Le et al. | |
| 7,739,682 B1 * | 6/2010 | Badenell | G06F 21/51 717/174 |
| 8,347,071 B2 | 1/2013 | Yan et al. | |
| 8,606,886 B2 | 12/2013 | Kerr et al. | |
| 2006/0048145 A1 * | 3/2006 | Celli | G06F 8/61 717/177 |
| 2008/0244689 A1 * | 10/2008 | Dalton | G06F 21/57 726/1 |
| 2009/0150463 A1 | 6/2009 | Sekiguchi et al. | |
| 2009/0320017 A1 * | 12/2009 | Jackson | G06F 8/61 717/174 |
| 2013/0042239 A1 * | 2/2013 | Mousseau | G06F 8/34 718/1 |
| 2013/0167136 A1 * | 6/2013 | Goldman | G06F 8/61 717/175 |

OTHER PUBLICATIONS

VMWare, Virtual Machine to Physical Machine Migration, 2005, pp. 1-22.*
Sugiki et al., Elements and Composition of Software-defined Data Centers, 2012, 2 pages.*
(Continued)

*Primary Examiner* — H S Sough
*Assistant Examiner* — Zhan Chen
(74) *Attorney, Agent, or Firm* — Scully, Scott, Murphy & Presser, P.C.; Rahan Uddin (57) ABSTRACT

A cloud based installer package is converted to a version that can be deployed in physical machines, e.g., by extracting an installer with embedded middleware configured to run on a remote cloud deployment, and identifying a physical machine to install the package and extracting information from the physical machine and utilizing the extracted information to convert the installer to a version that can be installed in a physical machine.

18 Claims, 3 Drawing Sheets

(56) References Cited

OTHER PUBLICATIONS

HowtoForge, Converting a VMware Image to a Physical Machine, 2012, pp. 1-7.*
"Virtual Machine to Physical Machine Migration" VMWARE technical note, pp. 1-22.
Hoover, H. et al., "Developer Blog: Cooking with Chef, part I" http://developer.rackspace.com/blog/cooking-with-chef.html, Posted on Jan. 11, 2013, pp. 1-6.
"Build, Ship and Run Any App, Anywhere" https://www.docker.io/, pp. 1-8.

* cited by examiner

USING CLOUD PATTERNS FOR INSTALLATION ON UNMANAGED PHYSICAL MACHINES AND APPLIANCES

FIELD

The present application relates generally to computers and computer applications, and more particularly to using virtual patterns to generate standalone installers for installation on a physical machine or appliance.

BACKGROUND

With the growth of cloud computing and pattern-based virtual systems, traditionally on-premise products need two installation programs: a traditional installer for software deployment and a pattern-based package for the cloud. Delivery of software as a virtual or physical appliance creates a third platform that product installers may need to support. However, in view of the proliferation of cloud computing and usage, traditional installers may not have been developed for many cloud-based products.

BRIEF SUMMARY

A method and system of converting a virtual pattern with embedded middleware to a version deployable on physical machines may be provided. The method, in one aspect, may comprise building a pattern for a middleware configured to run on a deployment platform. The method may also comprise generating, based on the pattern, a stand-alone installer to run on a physical machine without dependencies on the deployment platform. The method may further comprise extracting information from the physical machine. The method may further comprise installing the pattern with the embedded middleware on the physical machine by running the stand-alone installer and based on the information extracted from the physical machine.

A system for converting a virtual pattern with embedded middleware to a version deployable on physical machines, in one aspect, may comprise one or more processors running on a deployment platform. A middleware may be installed on the deployment platform. The one or more processors may be operable to build a pattern for the middleware. The one or more processors may be further operable to generate, based on the pattern, a stand-alone installer to run on a physical machine without dependencies on the deployment platform. A user interface may be provided that allows a user to select an option to generate the stand-alone installer on the deployment platform.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Techniques are disclosed that use a cloud pattern and deployment technology to generate a package that configures physical machines and deploy appliances. Such techniques are useful in developing efficient installers. Existing methods that convert virtual images to physical machines, opposite of the usual virtualization direction, do not use patterns or intelligent deployment. Generally, an appliance is a hardware device with integrated software or firmware (e.g., an operating system) and is specifically designed to provide a specific computing resource.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

A cloud computing environment is usually service oriented with a focus on statelessness, low coupling, modularity, and semantic interoperability. At the heart of cloud computing is an infrastructure comprising a network of interconnected nodes (computers/processors). It is understood in advance that although this disclosure includes a detailed description on cloud computing, implementation of the teachings recited herein are not limited to a cloud computing environment. Rather, embodiments disclosed herein are capable of being implemented in conjunction with any other type of computing environment now known or later developed, as applicable.

A pattern is a software package that includes deployment artifacts and configuration settings for use by a particular cloud platform. A cloud pattern refers to a logical description of both the physical and virtual assets that comprise a particular solution. For example, patterns in the present disclosure may comprise a logical representation of a recurring topology (e.g., arrangement of infrastructure elements) or application (e.g., database, enterprise application, web application, connections between applications and policies that describe specific configuration of components) requirements for a given set of deployment requirements. In one aspect, a pattern may be considered synonymous with a template. The cloud platform, for example, takes this package (e.g., a .zip file). There may be descriptor files in the pattern to tell the cloud how to deploy it, for example, how many Internet Protocol (IP) addresses are needed, or if a username and password is required. The pattern may also describe how the cloud platform passes these configuration parameters to the template when the image is being deployed. Generally, a pattern may be considered a simplified installation package, with all the input collected up-front by the cloud platform and then fed into the pattern. Patterns may have different formats, for example, proprietary or open standard to allow portability to other cloud platforms.

An install developer may create a cloud pattern that installs the software product and operating system. A cloud pattern may be created using cloud technologies, e.g., vSys or vApp on PureApplication™ System, from International Business Machines Corporation (IBM)®, Armonk, N.Y. PureApplication™ System has both virtual application patterns and virtual system patterns, commonly referred to as vApp and vSys patterns respectively. A vSys pattern includes an operating system and, potentially, additional software solutions. VApp patterns are constructed for the purpose of supporting a singular workload.

The cloud pattern may make use of a product installer. In another aspect, the product installer may not be necessary, rather the product install portion may include a set of deployment scripts. For example, a pattern may be provided in lieu of an installer. If there is a relationship, a developer may use a product installer to install the product on the cloud. Then cloud tools may be used to generate a pattern for that cloud. The techniques of the present disclosure in one embodiment take this process in the opposite direction: given a pattern, the techniques generate an installer. A distinction between an installer and a pattern is that the installer is run externally by a user, a system administrator or the like, whereas patterns are managed and deployed by the cloud (or a computing node) automatically. The cloud pattern bundles an operating system, other prerequisite software, and also defines supported prerequisites if they differ from bundled versions.

For example, in a cloud platform, it is possible to select an available pattern (e.g., an operating system pattern) in an image library and deploy the image. An embodiment of a methodology in the present disclosure generates a stand-alone installer (e.g., a bootable compact disc (CD) or digital video disc (DVD)) based on such pattern. Such techniques are useful for products that have a cloud pattern but do not yet have a standalone installer. A methodology in the present disclosure in one embodiment uses the cloud system to generate an installer, where the cloud system extracts the components that it needs to deploy the pattern, which components are all wrapped up into the new installer.

The install developer may export the cloud pattern as a bootable International Organization for Standardization (ISO) image. The cloud system generates this image by collecting the pattern pieces: application and operating system, and it also adds cloud platform binaries needed to run pattern deployment. Operating system images can be stored in ISO format if available.

At deployment time, the end-user may load the bootable ISO installer on a physical machine or appliance. If an operating system is already available at the required level, the installer deploys pattern application artifacts. If an operating system is not available, the installer deploys the operating system as ISO or file artifacts included in the installer. The installer optionally reconfigures hardware settings such as the network based on user input or input file.

An end result is a provisioned physical machine similar to a newly deployed cloud image. This approach has several advantages over traditional install and pattern development. For example, the product does not actually need an installer. Install logic can be provided by scripts that are run under the covers by the cloud platform engine. In products that are building cloud patterns, the same pattern can be used in place of maintaining a separate traditional installer. A single installer can be used for software installation into an existing operating system, or for deployment on a new machine. Install logic added to a cloud pattern can be reused across the cloud deployments, traditional installations, and standalone appliance or virtual machine (VM) generation, creating a common installer mechanism for all platforms.

The technique of the present disclosure include using cloud-based patterns to provision physical, unmanaged machines, and using cloud-based VMs in a non-virtualized environment. The techniques of the present disclosure may provide for automatic packaging of cloud technology for use in a non-cloud environment, and partial installation of cloud-patterns on physical machines based on software already installed on the physical machine. The techniques of the present disclosure may expose cloud-automated solutions such as network configuration as installer user interface (UI).

Figure 1:
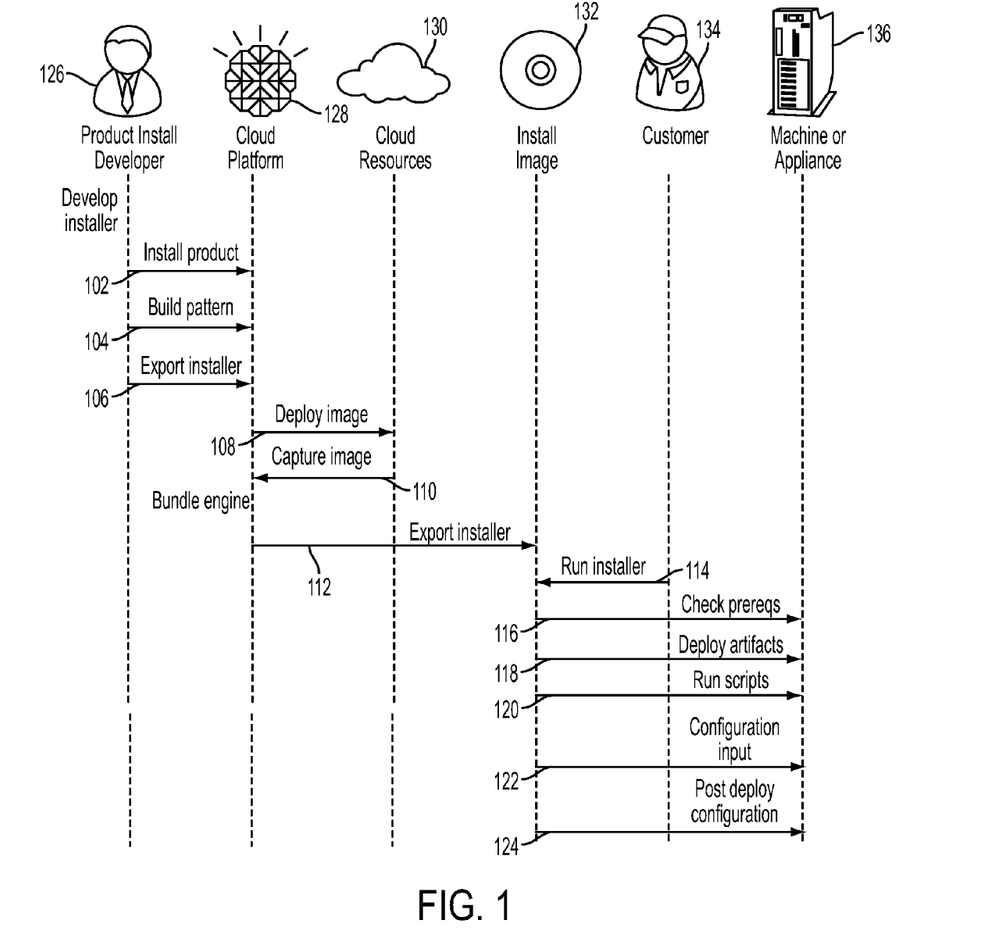
FIG. 1 is a diagram showing a method flow of using cloud patterns for installation on physical machines and appliances in one embodiment of the present disclosure.

FIG. 1 is a diagram showing a method flow of using cloud patterns for generating an install image and running installation of a product on physical machines and appliances in one embodiment of the present disclosure. At 102, the product developer deploys an initial image up on the cloud to get the product or software started. For example, a product install developer 126 configures a pattern in a cloud platform 128 to install the product at 102. This may be done, e.g., by: manual installation (using the product's existing installer), scripted installation (also using the product's existing installer), or manual deployment (e.g., copying files and running configuration manually), e.g., if a product installer does not exist. If the product is being manually configured, cloud capability may be utilized to capture a snapshot of the product.

The product install developer 126 combines the product install artifacts with a base operating system for installation, e.g., as done in cloud pattern development, to build pattern at 104. For example, the developer may use cloud tools to convert the freshly installed software into a cloud pattern. Cloud platforms provide a mechanism to wrap a deployed system into a pattern.

Instead of publishing the pattern or its artifacts, the cloud platform 128 provides a new "Export as ISO" capability, e.g., shown at 106. The ISO may be used as a boot image on a separate machine, e.g., 136, to deploy the software in the pattern. For instance, a cloud platform 128 has a user interface that provides a new "export as ISO" button or the like. Responsive to the developer 126 pressing this button, for example, the cloud platform 128 takes steps to generate a new installer for the selected pattern. A methodology of the present disclosure in one embodiment generates an installer through a combination of the pattern image and a set of tools needed to deploy that image. The cloud platform 128 then wraps the deployment tools and software image into a new executable (or bootable) installer 132. "Cloud platform" 128 refers to the cloud system that hosts the pattern. The techniques of the present disclosure may enhance an existing cloud technology with this "export as ISO" or like stand-alone installer generator capability.

When compiling an ISO image, the cloud platform 128 in one embodiment performs the following processing: 1. Convert the bundled operating system virtual image into a non-virtualized operating system install image. This could be done by bundling the original operating system install image with corresponding install scripts, or more typically by deploying the virtual image at 108 and capturing the image file artifacts at 110. 2. Add the product install and script portions. 3. Export the cloud platform pieces (components), e.g., 130, needed to deploy a pattern, e.g., at 112. The exported cloud platform (e.g., cloud platform pieces, tools, a mini version of the cloud platform, or any other components to deploy the pattern image) may be updated to run standalone, for example, providing disc boot logic (e.g., 132) and providing any UI needed to install the image. What the exported cloud platform looks like will be different for each cloud platform, based on the cloud platform technology.

After compiling the ISO image, the ISO can be used as a normal product installer. It can be loaded on a machine (e.g., 136) with a compatible operating system, on new hardware, or on a new hardware appliance. For example, the installer (compiled ISO image) may be run at 114, with one or more of the following processing: checking prerequisites at 116, deploying artifacts at 118, running scripts at 120, configuring input at 122, and performing post-deploy configuration at 124. For instance, the installer generated according to the methodology of the present disclosure behaves as a normal product installer, e.g., a software installer. For instance, if the product is being installed on a machine with an existing operating system, the bundled cloud platform may validate prerequisites and then deploy deployment steps but skipping the operating system portion. If the product is being installed on a new machine, the platform may deploy the operating system image files and proceed with application deployment as is done during cloud deployment. The installer may take user input (e.g., from 134) or an input file to configure pieces (components) normally handled by the cloud environment, such as Internet Protocol (IP) address and network configuration. At the end of the installation, the physical machine 136 includes the software provisioned with the operating system and product, similar to what would have been created by deploying a VM.

Generally, the techniques of the present disclosure take a pattern in the cloud (e.g., which only gets deployed in the cloud on cloud-managed machines), and use the cloud platform to generate a standalone installer. Then the user may take that installer and use it like an installer anywhere else, without any remaining cloud platform dependency. The cloud platform based on the pattern builds or develops a standalone installer.

The above-described techniques in one embodiment converts a cloud based installer package to a version that can be deployed in unmanaged physical machines, e.g., by extracting an installer with embedded middleware configured to run on a remote unmanaged system, and identifying a physical machine to install the package and extracting information from the physical machine and utilizing the extracted information to convert the installer to a version that can be installed in a physical machine. The generated installer does not have any cloud dependency.

Figure 2:
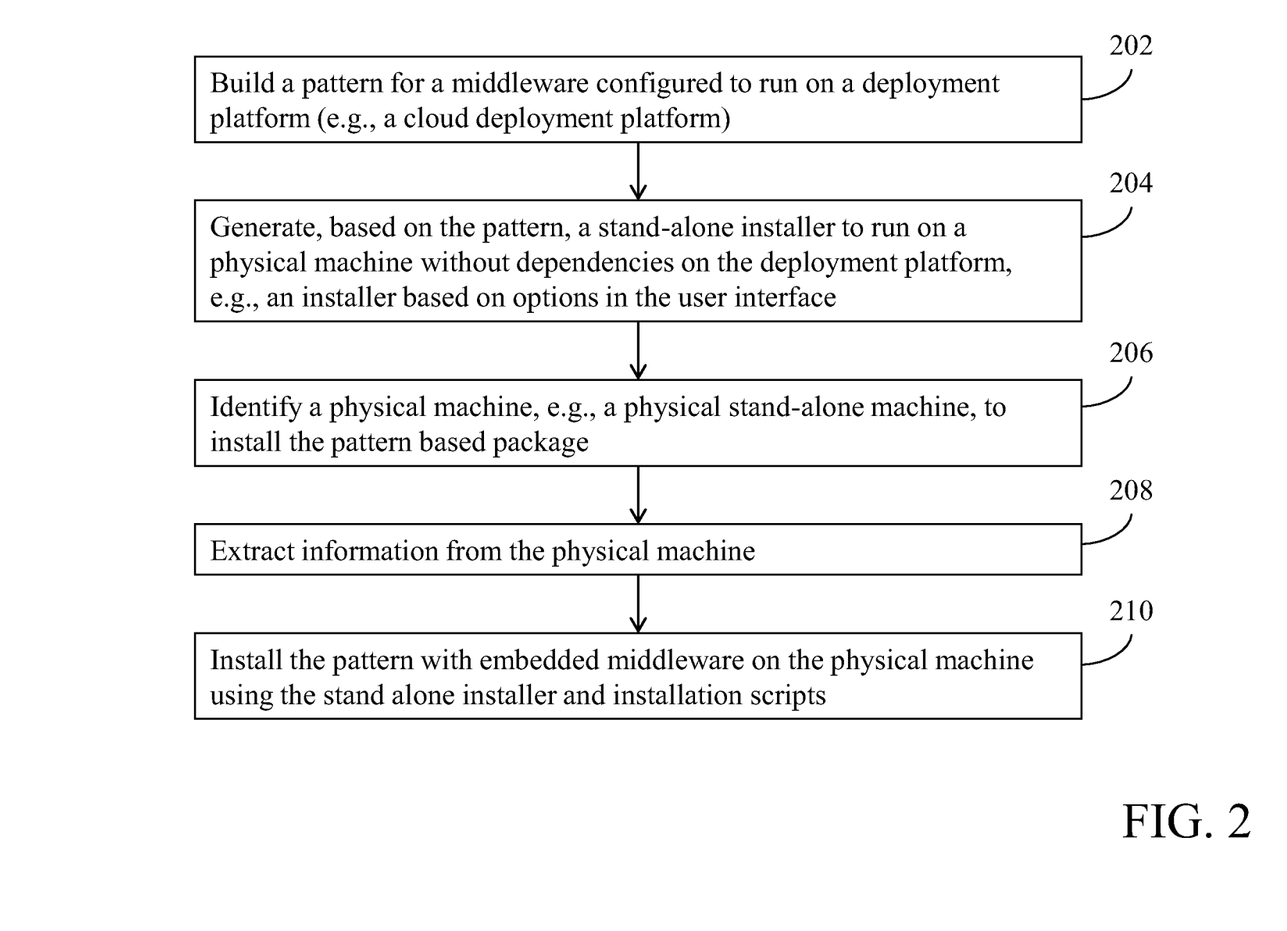
FIG. 2 is a flow diagram illustrating a method of converting a cloud or virtual based pattern with embedded middleware to a version deployable on a physical machine, in one embodiment of the present disclosure.

FIG. 2 is a flow diagram illustrating a method of converting a cloud or virtual based pattern with embedded middleware to a version deployable on a physical machine, in one embodiment of the present disclosure. At 202, a pattern is built for a middleware configured to run on a deployment platform. The deployment platform may include one or more computing nodes (e.g., processors) capable of managing one or more remote machines, and for example, refers to a cloud platform or cloud computing system. The pattern is used to generate an installer. As described above with reference to FIG. 1, the installer, for example, is built to include the cloud pattern, pieces (components) of the cloud system or deployment platform needed to deploy that pattern and a user interface for input (also based on the cloud system), wrapped into an executable/bootable package, for example, as shown at 204.

At 204, based on the pattern, a stand-alone installer, e.g., a bootable ISO image, is generated to run the middleware on a physical machine, e.g., a stand-alone machine, without dependencies on the deployment platform. For instance, the deployment platform may include a user interface that allows a user or a product install developer to select an option for generating a stand-alone installer for a product configured to run on the deployment platform. Such an operating system check may be generated by the requirements of the original pattern, for example to translate a pattern operating system dependency into an explicit validation in the standalone installer. Likewise, other factors such as disk space, middleware, operating system libraries, hardware architecture, and so forth, can be converted into installation validation steps based on the requirements of the pattern. In another aspect, the user interface associated with the deployment platform may also allow the user to select one or more products (e.g., middleware) that are configured to run on a deployment platform. Responsive to the user selecting the option and, e.g., selection the middleware, the processing at 202 and 204 may be performed.

At 206, a physical machine, e.g., a physical stand-alone machine, is identified to install the middleware. The physical stand-alone machine may be a stand-alone hardware or an appliance. At 208, information may be extracted from the physical machine (also referred to as a target machine). For example, the target machine (identified physical machine) may be inspected to determine whether the target machine has one or more components (e.g., operating system (if any)) that matches defined prerequisites. For instance, if the newly generated installer installs an application for running on a certain operating system, a check is made to determine whether the physical machine has that operating system installed.

At 210, the stand alone installer and installation scripts are utilized to install the pattern with embedded middleware on the physical machine.

In one embodiment of the present disclosure, a physical-machine-capable version of the pre-existing pattern engine may be utilized to deploy patterns directly on physical machines, e.g., by creating separate installers, partial installs, and/or leveraging any of the intelligence captured in patterns, e.g., creating an end-user installer. For instance, a pattern may be used to create a physical machine installation image. In this way, a developer need not create both pattern-based installers and traditional installers. Same pattern (e.g., different from a shrink-wrapped image) may be reused for deployment, e.g., porting a pattern engine to a non-cloud environment.

Figure 3:
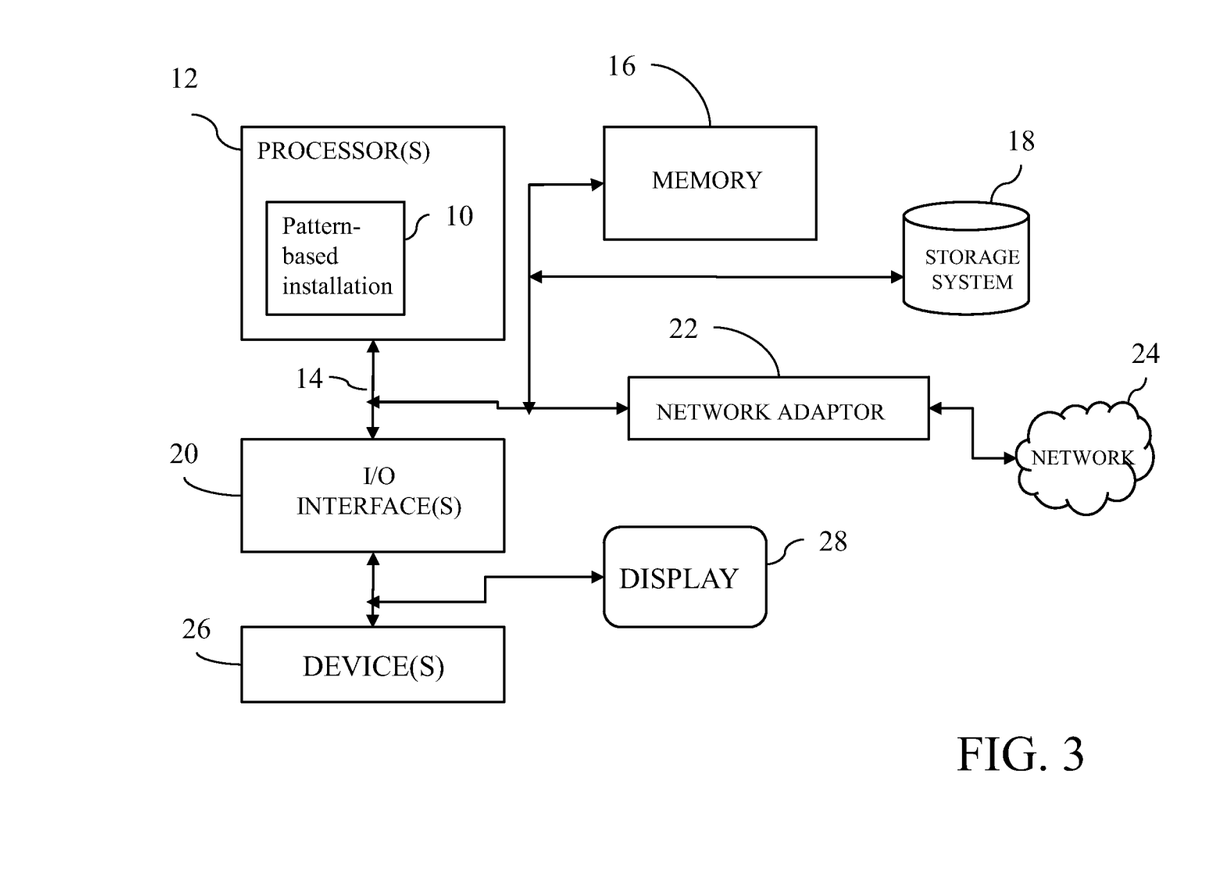
FIG. 3 illustrates a schematic of an example computer or processing system that may implement a pattern based installer system in one embodiment of the present disclosure.

FIG. 3 illustrates a schematic of an example computer or processing system that may implement a pattern based installer system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for converting a virtual pattern with embedded middleware to a version deployable on physical machines, comprising:

building a pattern for an embedded middleware configured to run on a deployment platform, the deployment platform comprising one or more computing nodes, the pattern representing a logical description of physical and virtual assets and comprising deployment artifacts and configuration settings for use in the deployment platform;

generating, based on the pattern, a stand-alone installer to run on a physical machine without dependencies on the deployment platform, the deployment platform comprising a shared pool of configurable computing resources providing on-demand network access and providing virtualized environment, the generating comprising at least converting a bundled operating system virtual image associated with the pattern into a non-virtualized operating system install image by deploying the bundled operating system virtual image on the deployment platform and capturing image file artifacts associated with the deployed virtual image, the non-virtualized operating system install image being an operating system that can run on the physical machine in a non-virtual environment;

extracting information from the physical machine; and installing the embedded middleware and the non-virtualized operating system install image on the physical machine by running the stand-alone installer and based on the information extracted from the physical machine.

2. The method of claim 1, wherein the installing comprises installing the embedded middleware and the non-virtualized operating system install image on the physical machine by running the stand-alone installer and one or more installation scripts.

3. The method of claim 1, wherein the physical machine comprises an appliance.

4. The method of claim 1, wherein the stand-alone installer comprises a bootable ISO image.

5. The method of claim 1, further comprising providing a user interface on the deployment platform, the user interface allowing a user to select an option to generate the stand-alone installer for the embedded middleware.

6. The method of claim 5, wherein the user interface further allows the user to select the embedded middleware.

7. A computer readable storage medium storing a program of instructions executable by a machine to perform a method of converting a virtual pattern with embedded middleware to a version deployable on physical machines, the method comprising:
building a pattern for an embedded middleware configured to run on a deployment platform, the deployment platform comprising one or more computing nodes, the pattern representing a logical description of physical and virtual assets and comprising deployment artifacts and configuration settings for use in the deployment platform;
generating, based on the pattern, a stand-alone installer to run on a physical machine without dependencies on the deployment platform, the deployment platform comprising a shared pool of configurable computing resources providing on-demand network access and providing virtualized environment, the generating comprising at least converting a bundled operating system virtual image associated with the pattern into a non-virtualized operating system install image by deploying the bundled operating system virtual image on the deployment platform and capturing image file artifacts associated with the deployed virtual image, the non-virtualized operating system install image being an operating system that can run on the physical machine in a non-virtual environment;
extracting information from the physical machine; and
installing the embedded middleware and the non-virtualized operating system install image on the physical machine by running the stand-alone installer and based on the information extracted from the physical machine.

8. The computer readable storage medium of claim 7, wherein the installing comprises installing the embedded middleware and the non-virtualized operating system install image on the physical machine by running the stand-alone installer and one or more installation scripts.

9. The computer readable storage medium of claim 7, wherein the physical machine comprises an appliance.

10. The computer readable storage medium of claim 7, wherein the stand-alone installer comprises a bootable ISO image.

11. The computer readable storage medium of claim 7, further comprising providing a user interface on the deployment platform, the user interface allowing a user to select an option to generate the stand-alone installer for the embedded middleware.

12. The computer readable storage medium of claim 11, wherein the user interface further allows the user to select the embedded middleware.

13. A system for converting a virtual pattern with embedded middleware to a version deployable on physical machines, comprising:
one or more processors running on a deployment platform, the deployment platform comprising one or more computing nodes;
an embedded middleware installed on the deployment platform;
the one or more processors operable to build a pattern for the embedded middleware, the pattern representing a logical description of physical and virtual assets and comprising deployment artifacts and configuration settings for use in the deployment platform,
the one or more processors further operable to generate, based on the pattern, a stand-alone installer to run on a physical machine without dependencies on the deployment platform at least by converting a bundled operating system virtual image associated with the pattern into a non-virtualized operating system install image by deploying the bundled operating system virtual image on the deployment platform and capturing image file artifacts associated with the deployed virtual image, the deployment platform comprising a shared pool of configurable computing resources providing on-demand network access and providing virtualized environment, the non-virtualized operating system install image being an operating system that can run on the physical machine in a non-virtual environment; and
a user interface operable to allow a user to select an option to generate the stand-alone installer on the deployment platform,
the stand-alone installer operable to install the embedded middleware and the non-virtualized operating system install image on the physical machine.

14. The system of claim 13, wherein the user interface further allows the user to select the embedded middleware for which to generate the stand-alone installer.

15. The system of claim 13, wherein the stand-alone installer is operable to extract information from the physical machine.

16. The system of claim 13, wherein the physical machine comprises an appliance.

17. The system of claim 13, wherein the stand-alone installer comprises a bootable ISO image.

18. The system of claim 17, wherein the stand-alone installer comprises at least the pattern, one or more components of the deployment platform required to deploy the pattern, and a stand-alone user interface operable to receive input for use by the stand-alone installer.

* * * * *